US009097199B2

(12) United States Patent
Neama et al.

(10) Patent No.: US 9,097,199 B2
(45) Date of Patent: Aug. 4, 2015

(54) ENGINE SIGNATURE ASSESSMENT SYSTEM

(75) Inventors: Roger Neama, Windsor, CT (US); Brian London, Atascosa, TX (US); Larry R. Breen, Plantsville, CT (US); Rocco S. Cuva, South Glastonbury, CT (US); Alun L. Buttermore, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 169 days.

(21) Appl. No.: 13/529,305

(22) Filed: Jun. 21, 2012

(65) Prior Publication Data

US 2013/0345923 A1 Dec. 26, 2013

(51) Int. Cl.

| | |
|---|---|
| ***G01M 17/00*** | (2006.01) |
| ***G08B 1/08*** | (2006.01) |
| ***F02D 41/26*** | (2006.01) |
| *F02D 41/22* | (2006.01) |

(52) U.S. Cl.
CPC ................ *F02D 41/26* (2013.01); *F02D 41/22* (2013.01)

(58) Field of Classification Search
CPC ...... C23C 30/00; C23C 10/58; C04B 41/522; C04B 41/89
USPC ........... 701/29.4, 29.1, 31.4, 32.7, 33.2, 34.3, 701/34.4; 340/539.11, 539.24, 572.1
See application file for complete search history.

(56) References Cited

U.S. PATENT DOCUMENTS

| | | | | |
|---|---|---|---|---|
| 5,012,248 | A | 4/1991 | Munro et al. | |
| 5,185,579 | A | 2/1993 | Mertens et al. | |
| 5,483,169 | A | 1/1996 | Despain et al. | |
| 5,694,763 | A | 12/1997 | Amelio et al. | |
| 6,788,244 | B1 | 9/2004 | Tam | |
| 6,857,600 | B1 * | 2/2005 | Walker et al. | 244/73 R |
| 6,941,204 | B2 * | 9/2005 | Halm et al. | 701/29.4 |
| 7,379,799 | B2 | 5/2008 | Cleary et al. | |
| 7,395,657 | B2 | 7/2008 | Johnson | |
| 8,131,509 | B2 | 3/2012 | Novis | |
| 2006/0004499 | A1 | 1/2006 | Trego et al. | |
| 2007/0043536 | A1 * | 2/2007 | Tonack et al. | 702/184 |
| 2008/0104940 | A1 | 5/2008 | Gustafsson | |
| 2009/0226074 | A1 * | 9/2009 | London | 382/141 |
| 2009/0243854 | A1 * | 10/2009 | Scheid et al. | 340/572.1 |

* cited by examiner

*Primary Examiner* — Muhammad Shafi
(74) *Attorney, Agent, or Firm* — Carlson, Gaskey & Olds, P.C.

(57) ABSTRACT

The disclosed method and system utilizes inspection information from individual components to predict a value for a system performance parameter. The predicted system performance parameter is utilized to determine if corrective action is required for any of the system components. No corrective action is recommended if the predicted system performance parameter is within desired limits. Further, corrective action for a specific component of the system is performed and indicated independent of the inspection results of a specific component.

14 Claims, 2 Drawing Sheets

ENGINE SIGNATURE ASSESSMENT SYSTEM

STATEMENT REGARDING FEDERALLY SPONSORED RESEARCH OR DEVELOPMENT

The subject of this disclosure was made with government support under Contract No.: 61-441-R2006 awarded by the United States Air Force. The government therefore may have certain rights in the disclosed subject matter.

BACKGROUND

An aircraft includes many different systems that contain individual components that act in concert to provide a desired purpose. An aircraft may include a gas turbine engine that includes a compressor section, a combustor section, a turbine section, and an exhaust system including a turbine exhaust case, augmenter section, and nozzle section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The exhaust gases are expelled through an exhaust system. Aircraft systems such as those comprising the gas turbine engine are inspected periodically.

During inspection and maintenance activities, component parts of various aircraft systems are measured to determine if they remain within their predefined limits for each individual component. Parts that are outside their predefined limits are replaced regardless of the current state of engine system performance. Accordingly, some components may be replaced even though system performance is not impacted. It is therefore desirable to design and develop maintenance procedures that improve evaluation and reduce replacement occurrences and costs while maintaining the required system level performance.

SUMMARY

A method of maintaining a system according to an exemplary embodiment of this disclosure, among other possible things includes inspecting at least one feature of a plurality of components of a system and recording at least one inspection result, inputting the inspection results of the feature into an assessment system, evaluating the input inspection results of the feature with the assessment system to determine a predicted value of an system performance parameter, and performing a maintenance activity based on the predicted value of the system performance parameter.

In a further embodiment of the foregoing method, including evaluating the inspection results includes comparing the inspection results of the features of the plurality of components to a predefined set of inspection results and selecting from a plurality of predicted values corresponding to the selected one of the predefined inspection results.

In a further embodiment of any of the foregoing methods, including evaluating the inspection results based on a model of the system, the model characterizes system operation responsive to inspected component conditions.

In a further embodiment of any of the foregoing methods, including generating a predicted value of the system performance parameter for the input inspection results.

In a further embodiment of any of the foregoing methods, the feature of the plurality of components comprises a coating loss and the system performance parameter comprises radar cross-section.

In a further embodiment of any of the foregoing methods, including measuring the coating loss on a plurality of engine exhaust system components and predicting a radar cross-section based on the measured coating loss.

In a further embodiment of any of the foregoing methods, including identifying a component of the engine exhaust system that requires corrective action responsive to the radar cross-section being outside of predefined limits.

In a further embodiment of any of the foregoing methods, including indicating that no corrective action is required responsive to the predicted radar cross-section being within predefined limits.

In a further embodiment of any of the foregoing methods, including identifying a component of the system for corrective action based on the predicted value of the system performance parameter independent of the inspection results for the feature of that component.

In a further embodiment of any of the foregoing methods, including predicting a mean time to component replacement based the predicted value of the system performance parameter.

A signature assessment system according to an exemplary embodiment of this disclosure, among other possible things includes an input for recording inspection information from a plurality of components of a system, and an evaluation module for predicting a value of a system performance parameter based on the inspection information from the plurality of components.

In a further embodiment of the foregoing signature assessment system, the evaluation module determines a disposition of each of the plurality of components based on the predicted value of the system performance parameter.

In a further embodiment of any of the foregoing signature assessment systems, the evaluation module includes a model for predicting system performance based on the component inspection information of the plurality of components of the aircraft system.

In a further embodiment of any of the foregoing signature assessment systems, the component inspection information comprises a coating characteristic of an aircraft exhaust system component.

In a further embodiment of any of the foregoing signature assessment systems, the coating characteristic comprises a coating loss.

In a further embodiment of any of the foregoing signature assessment systems, the performance parameter comprises a radar cross-section of the aircraft exhaust system.

In a further embodiment of any of the foregoing signature assessment systems, the evaluation module predicts a mean time to component replacement based on the predicted value of the system performance parameter.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
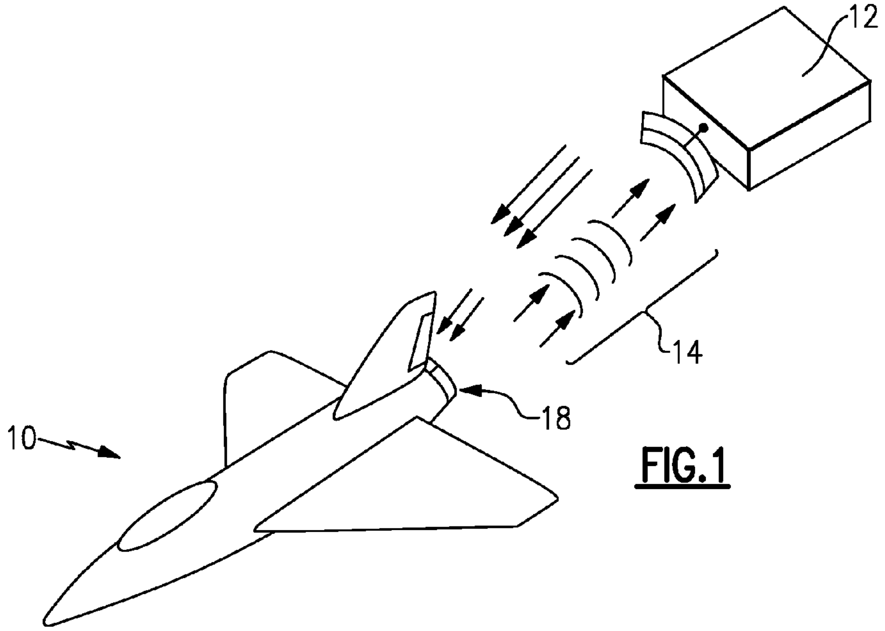
FIG. 1 is a schematic view of an example aircraft and radar signature evaluation.
Figure 2:
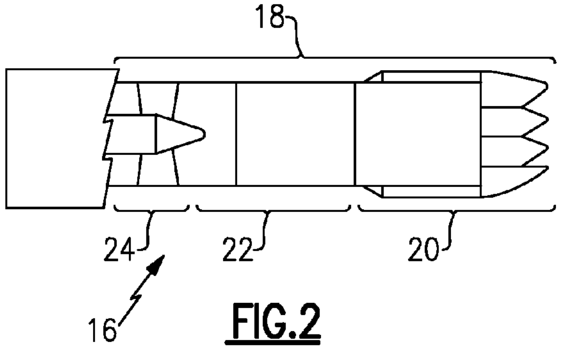
FIG. 2 is a schematic view an example aircraft exhaust system.

Referring to FIGS. 1 and 2, an example aircraft 10 includes a gas turbine engine 16 that includes an exhaust system 18. The example exhaust system 18 includes a plurality of component parts that operate as a system. The exhaust system 18 includes a nozzle 20, an exhaust case 22, and an augmenter 24. As appreciated, aircraft exhaust systems can include many different components. The nozzle 20, exhaust case 22 and augmenter 24 are disclosed and described as an example and are not intended to be a comprehensive listing of components comprising the example exhaust system 18. Moreover, although an exhaust system is described by way of example, other systems may benefit from the disclosures herein.

Each of the component parts 20, 22, 24 operates in concert to provide a measurable system performance characteristic. In this example, the system performance characteristic is a radar signature (schematically indicated at 14) returned to a radar system 12 generated by returns from the example exhaust system 18.

During maintenance and inspection of the aircraft 10, component parts of the aircraft are measured and inspected. The results of the measurements and inspections determine if further required maintenance and replacement actions are required. Current maintenance and inspection methods measure each separate aircraft component against defined criteria for that particular component.

Figure 3:
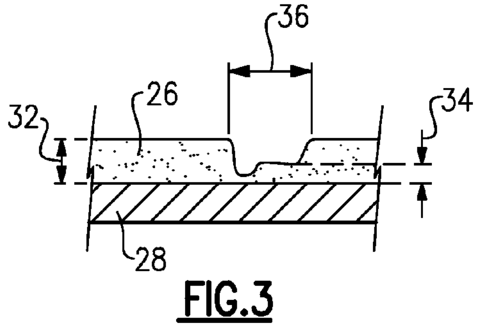
FIG. 3 is a cross-section of a coated component of the example exhaust system.

Referring to FIG. 3 with continued reference to FIGS. 1 and 2, in some instances, the criteria for measuring and determining whether a component needs to be replaced include a measurable physical dimension. In the disclosed example, each of the components 20, 22, 24 includes a coating 26. Traditional maintenance schemes compare measurements and/or inspection of physical characteristic against acceptance criteria for that component to determine if replacement is required. Accordingly, traditionally an evaluation of each component part is performed without consideration to the current condition of other components within the system and the impact of resulting overall system performance.

The example method and system utilizes measurements from various components of an aircraft system to determine and predict overall system performance. In this example, the system performance parameter is the radar cross section 14. The radar cross section 14 is an attribute of the aircraft 10 that is sought to be minimized. Radar cross section is typically reduced by providing a specific configuration or shape of an aircraft and by providing a radar absorbent coating over certain surfaces and part components of an aircraft system.

Figure 4:
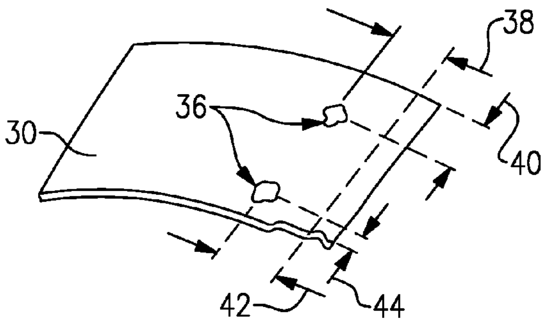
FIG. 4 is a perspective view of an example coated component of the example exhaust system.

Referring to FIG. 4 with continued reference to FIGS. 2 and 3, in the disclosed example, the exhaust system 18 includes radar absorbing coating 26. Each of the components 20, 22, and 24 includes the coating 26 applied over an underlying substrate 28. The coating 26 is applied to a desired thickness 32 throughout the surface of the component 20, 22, 24. Operation of the exhaust system 18 and specifically the performance of the coating 26 affect the radar cross section 14 of the aircraft 10.

In this example, during maintenance and inspection procedures, parts of the nozzle 20, the exhaust case 22, and the augmenter 24 are inspected for coating loss. In this example coating areas 36 with a reduced thickness 34 are measured. The greater the coating loss the potential greater effect on the overall system performance parameter. However, coating loss on one component alone is not indicative nor does it directly correspond to an impact on the radar cross-section 14 of the exhaust system 18. Accordingly, one component in the exhaust system 18 may have significant coating loss without detrimentally affecting the overall system performance.

The disclosed method and system evaluates and predicts system performance based on inspection and measurement of individual components of an aircraft system.

In this example, a coating loss indicated at 36 is measured for each component part of a nozzle 20, the exhaust case 22, and the augmenter 24. The measured coating loss 36 for each of the components 20, 22, and 24 are evaluated together based on predetermined criteria and models to predict a value of the system performance parameter. In this example, the system performance parameter is the radar cross-section 14. If the predicted radar cross-section 14 remains within acceptable performance limits then no replacement of any of the components 20, 22, 24 is required. The example method and system utilizes predicted system performance with the condition of the components as inspected and measured to determine and make decisions regarding further maintenance actions. As appreciated, no replacement of the component parts regardless of the amount of coating loss 36 is required if the overall predicted system performance remains within acceptable limits.

Figure 5:
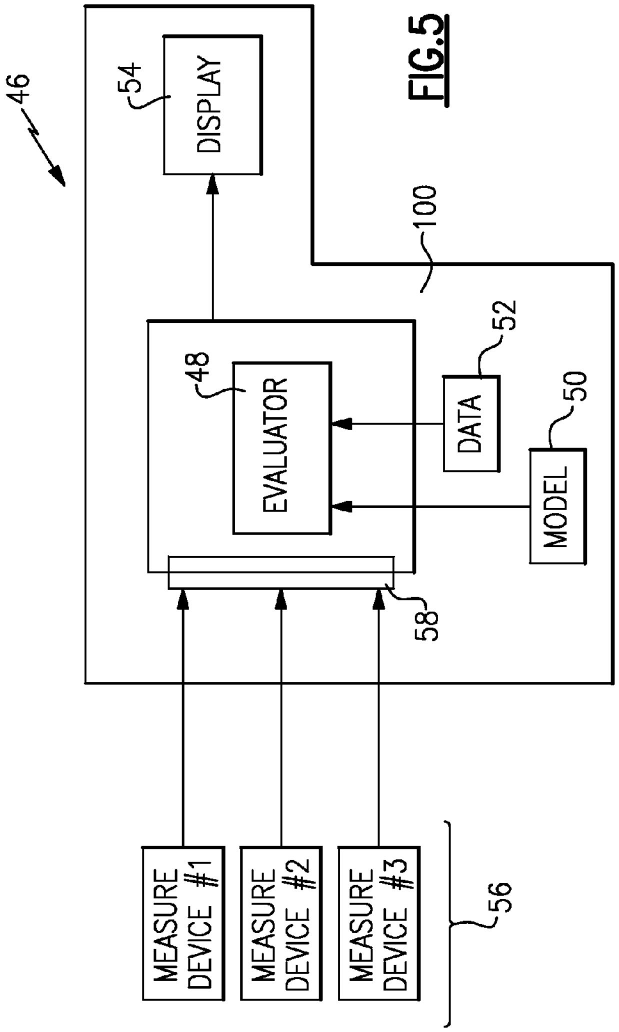
FIG. 5 is a schematic view of an example engine signature assessment system.

Referring to FIG. 5, the signature assessment system 46 includes an input 58, a display 54 and an evaluator 48. Measurement devices generally indicated at 56 are utilized to gather information indicative of coating loss 36. The measurement devices 56 can include any measurement device or technique utilized for gathering information utilized to evaluate coating loss 36. As appreciated, other evaluation parameters would utilize different measurement devices and techniques and are within the contemplation of this disclosure.

The signature assessment system 46 includes an evaluator module 48. The evaluator module 48 receives the input measurement data and utilizes defined criteria including system models, generated algorithms and data to formulate a predicted system performance value. In this example, the evaluator module 48 receives data and information on the location and coating loss 36 for each component and generates a value indicative of a predicted radar cross-section expected as a result of the condition of all of the components in the exhaust system 18. The predicted value is then compared against overall performance requirements to determine if further action is required. If the predicted radar cross-section falls within accepted performance limits, then no component replacement is required. This is so, even if specific components include coating loss 36 that if evaluated individually would initiate component replacement when evaluated on an individual component level.

The example evaluator module 48 includes algorithms that are utilized to interpret the inspection data input from the measurement devices 56 and/or visual inspections. The example algorithms utilized by the evaluator 48 are formulated utilizing a model 50 of the example exhaust system 18. The example algorithms may also be formulated using historical data indicated at 52. The evaluator module 48 may also utilize data gathered from a series of correlated component measurements and radar cross-section measurements. The evaluator module 48 may utilize other statistical and analysis techniques and processes that provide for the correlation between measured values of system components and overall system performance.

In this example once the evaluator 48 is provided with the input data from the various measurement devices 56 and inspections, it determines a predicted value of the radar cross-section 14. The predicted value is then utilized to determine instructions for any corrective action that may be needed, and is communicated to a technician through the display device 54. If the performance parameter 14 is predicted to be within acceptable limits the display device 54 will indicate that the system 18 is within acceptable limits and no component replacement will be required. However, if the predicted performance parameter is outside of desired performance criteria then the display 54 will provide instructions as to what corrective actions need to be taken. Corrective actions can include replacement of a single component or multiple components that are intended to allow the system to fall within acceptable performance criteria.

The disclosed method 60 (FIG. 6) and signature assessment system 46 can be performed as part of a computing device 100 to implement various functionality. In terms of hardware architecture, such a computing device 100 can include a processor, a memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device 100 is in operation, the processor can be configured to execute software stored within the memory, to communicate data to and from the memory, and to generally control operations of the computing device 100 pursuant to the software. Software in memory, in whole or in part, is read by the processor, perhaps buffered within the processor, and then executed.

Figure 6:
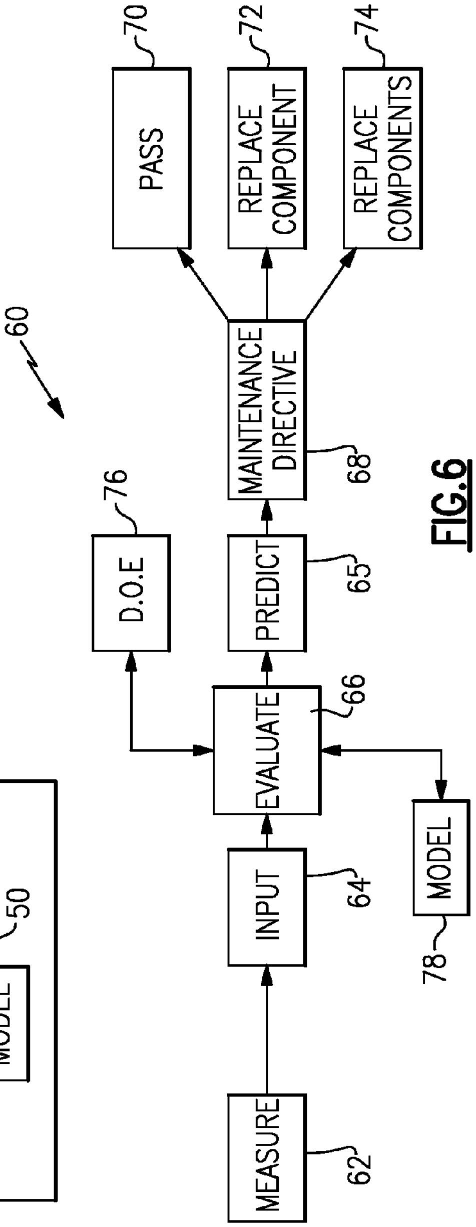
FIG. 6 is a diagram illustrating example steps for evaluating system maintenance requirements.

Referring to FIG. 6, a flow diagram of the example maintenance method includes a first step of measuring a plurality of component parts of a system 18. The measurements may be conducted utilizing any devices or methods as are known. In this example, the measurement step includes inspection of coating loss for each component part. Moreover, the measurement step 62 also includes not only the determination of coating loss 36 but also of a location of the coating loss.

Referring to FIG. 4 with continued reference to FIG. 6, the measurement parameter 62 includes the determination of size and location of coating loss 36. An identification of a specific part on which the coating loss 36 is found can be utilized as the location. Moreover, a location of a coating loss 36 can be determined by associating the area of coating loss 36 with an engine coordinate or identifiable feature of the system 18.

Additionally, the location can be determined by coordinates 38 and 40 as shown in FIG. 4. As is shown schematically, a component part 30 includes coating loss 36 at located at coordinates 38 and 40. Another coating loss 36 is shown at a second set of coordinates 42, 44. The coordinates 38, 40, 42 and 44 represent any system utilized for locating features within the system, such as for example a known engine coordinate system. Furthermore, any other method of identifying and locating coating loss 36 within the system 18 are within the contemplation of this disclosure.

Referring to FIG. 6 with reference to FIGS. 3, 4 and 5, the example method is shown schematically and generally indicated at 60 and includes the initial step of inspecting a parameter of a component part 62. In this example, the nozzle 20, exhaust case 22 and augmenter 24 are inspected for coating loss 36. The amount of the coating loss 36 is determined for those locations with a reduced coating thickness as indicated in this example at 34. In addition, a location of the coating loss 36 with respect to a coordinate grid system for that component is also recorded. In this example, the position coating loss area 36 is indicated by coordinate sets 38, 40 and 40, 42. As appreciated other systems for indicating location could be utilized.

The measurement and inspection data is then input as indicated at 64 into the system 46 and an evaluation performed as indicated at 66. The input of measurement and inspection data can be accomplished by interfacing with a graphical user interface that is commonly utilized for computer programs. Moreover, input 64 may be accomplished through manual and automatic measurement techniques utilizing known measurement devices 56.

Once data is input into the signature assessment system 46, an evaluation step indicated at 66 is performed. The evaluation step 66 utilizes the measurement and inspection data to determine a predicted system performance value. The predicted performance value can be determined based on a system model 78 or by a comparison to data accumulated from historical data and/or from experimental methods 76.

The evaluator 66 outputs a prediction 65 of the system performance parameter that in this example is a predicted radar cross-section 14 of the exhaust system 18 with components 20, 22, and 24. The predicted radar cross-section 14 is then utilized to determine a maintenance directive indicated at 68. If the predicted radar cross-section 14 falls within desired limits then the maintenance directive 68 indicates that the system passes as shown at 70. If the predicted cross-section 14 is outside of desired limits then the maintenance directive 68 will indicate that either a single component should be replaced as indicated at 72, or multiple components need to be replaced as indicated at 74. Although in this example the corrective action includes replacement of a component; corrective actions other than replacement could be utilized to bring system performance back within acceptable limits. The system may store data and may utilize that data to predict a mean time to the next required maintenance action.

The example system and engine assessment system 46 and method 60 reduces instances of component replacement and increases engine operation time while reducing maintenance costs and operational down time.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of maintaining a system comprising:

inspecting at least one feature of a plurality of components of a system and recording at least one inspection result;

inputting the inspection results of the feature into an assessment system, the assessment system including a model of a system including the at least one component that determines a system performance parameter based on the input results of the inspected at least one feature;

determining a predicted value of the system performance parameter with the model of the system based on the input inspection results of the feature utilizing the predicted value to determine instructions for corrective action; and displaying the determined instructions for the corrective action on a display device.

2. The method as recited in claim 1, including evaluating the inspection results includes comparing the inspection results of the features of the plurality of components to a predefined set of inspection results and selecting from a plurality of predicted values corresponding to the selected one of the predefined inspection results.

3. The method as recited in claim 1, wherein the feature of the plurality of components comprises a coating loss and the system performance parameter comprises radar cross-section.

4. The method as recited in claim 3, including measuring the coating loss on a plurality of engine exhaust system components and predicting a radar cross-section based on the measured coating loss.

5. The method as recited in claim 4, including identifying a component of the engine exhaust system that requires corrective action responsive to the radar cross-section being outside of predefined limits.

6. The method as recited in claim 4, including indicating that no corrective action is required responsive to the predicted radar cross-section being within predefined limits.

7. The method as recited in claim 1, including identifying a component of the system for corrective action based on the predicted value of the system performance parameter independent of the inspection results for the feature of that component.

8. The method as recited in claim 7, including predicting a mean time to component replacement based the predicted value of the system performance parameter.

9. A signature assessment system comprising:

an input device configured to record inspection information from a plurality of components of a system; and an evaluation module configured to predict a value of a system performance parameter based on the inspection information from the plurality of components, wherein the evaluation module includes a model for predicting system performance based on the component inspection information of the plurality of components of an aircraft system, wherein the evaluation module is also configured to determine a predicted value of the parameter and configured to utilize the predicted value to determine instructions for a corrective action and to display the instructions for the corrective action on a display device.

10. The signature assessment system as recited in claim 9, wherein the evaluation module determines a disposition of each of the plurality of components based on the predicted value of the system performance parameter.

11. The signature assessment system as recited in claim 9, wherein the component inspection information comprises a coating characteristic of an aircraft exhaust system component.

12. The signature assessment system as recited in claim 11, wherein the coating characteristic comprises a coating loss.

13. The signature assessment system as recited in claim 11, wherein the performance parameter comprises a radar cross-section of the aircraft exhaust system.

14. The signature assembly system as recited in claim 9, wherein the evaluation module predicts a mean time to component replacement based on the predicted value of the system performance parameter.

* * * * *